United States Patent Office 3,362,810
Patented Jan. 9, 1968

3,362,810
HERBICIDAL CLAY FORMULATION
John M. Deming, Hazelwood, Mo., assignor to Monsanto Company, St. Louis, Mo., a corporation of Delaware
No Drawing. Filed Aug. 1, 1966, Ser. No. 569,015
15 Claims. (Cl. 71—118)

ABSTRACT OF THE DISCLOSURE

Composition comprising particulate clay of non-expanding lattice structure such as illite containing compounds of the following formula have phytotoxic utility:

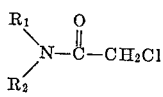

wherein $R_1$ and $R_2$ are substituents selected from the group consisting of hydrogen and straight chain linear hydrocarbon of not more than six carbon atoms, provided that not more than one of $R_1$ and $R_2$ is hydrogen.

---

The present application is a continuation-in-part of copending application Ser. No. 485,117, filed Sept. 3, 1965, which in turn is a continuation-in-part of application Ser. No. 193,007, filed May 7, 1962, and both now abandoned.

This invention relates to improved phytotoxic compositions. More specifically, this invention relates to phytotoxic compositions which provide optimum efficiency in use. In the practice of this invention, greater pre-emergent destruction of plant life can be obtained with minimum amounts and low concentrations of phytotoxic compounds.

There has been an increasing trend in the use of phytotoxic or herbicidal compositions in particulate form during recent years. This is due to certain inherent objectionable features in the use of solutions or emulsions, which for a long time have been conventional practices. It is well known that sprays frequently cannot be controlled adequately to avoid injuring crops in adjacent fields. Furthermore, the large volumes of water required in the preparation of solutions or emulsions create serious problems, due to the weight of water required in the preparation of sufficiently dilute formulations to enable a uniform treatment of the soil. It has been found impracticable to build equipment with sufficient tank volumes to cover a reasonable area without frequent reloading.

The use of phytotoxic or herbicidal compositions in particulate form is convenient and economical in providing for the uniform and effective application of a product to the soil. This is particularly important where the quantity applied is critical in the application of a sufficient amount to permit phytotoxic or herbicidal activity without an excessive amount which might inhibit the growth of desirable plants. These compositions are conventionally prepared by applying the phytotoxic compound to preformed particles of an inert carrier. It is desirable to use clays which can be comminuted to a relatively uniform particle size. Generally, a range of particles from 10–100 mesh is used but best performance is obtained from more uniform sizes of particles, for example 14–80 mesh with a large majority of the particles between 20 and 40 mesh. Attapulgus clay is often used but possesses certain inherent disadvantages.

The term "mesh" as used herein and in the appended claims is that of the U.S. Sieve Series.

The phytotoxic compounds used in the practice of this invention are the alpha-chloroacetamides having from 1 to 2 short aliphatic substituents on the amide nitrogen atom. These have been extensively used as grass specific phytotoxic compounds or herbicides and have been most often used in solid form absorbed on attapulgus clay granules. These compounds include N,N-dimethyl alpha-chloroacetamide, N-ethyl alpha-chloracetamide, N,N-diethyl alpha-chloroacetamide, N-propyl alpha-chloroacetamide, N-propyl alpha-chloroacetamide, N-allyl alpha-chloroacetamide, N,N - diallyl alpha - chloroacetamide, N(n-butyl) alpha-chloroacetamide and N,N-propargyl alpha-chloroacetamide. The hydrocarbon substituents may have up to six carbon atoms but the optimum chain length is two or three carbon atoms.

These compounds may be represented by the general formula

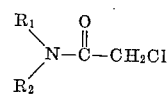

wherein $R_1$ and $R_2$ are substituents selected from the group consisting of hydrogen and straight chain linear hydrocarbon radicals of one to four carbon atoms, provided that not more than one of the $R_1$ and $R_2$ substituents is hydrogen.

The above alpha-chloroacetamides are preferred but in general any alpha-chloroacetamides having 1 or 2 straight chain aliphatic substituents of up to 6 carbon atoms are useful. These compounds in general are relatively volatile and sufficiently water soluble to present problems in losses to the atmosphere or to the soil water. The alpha-chloroacetamides of best activity are those with two aliphatic substituents having two or three carbon atoms on the nitrogen atom.

The prior art particulate N-substituted alpha-chloroacetamide herbicidal or phytotoxic compositions have the ability to absorb certain volatile herbicidal compounds but the absorption forces are not strong enough to prevent the desorption and loss of the active component to the atmosphere. Furthermore, if the active compounds are soluble, the active compound may be leached from the carrier and lost in the soil water.

The solution to this problem was found in the selection of a carrier particle which had adsorptive properties as distinguished from the absorptive properties of the attapulgus clay. This adsorption is known to be a stronger bond than the absorption on the attapulgite. This adsorptive action may under some circumstances be so great as to tie up the phytotoxic compound in such a way that it is unavailable for phytotoxic use. The expanding lattice clays are capable of forming hard particles, which however cannot resist the erosive effect of water. The expanding nature of these clays in the presence of water causes the hard particles to slake and break down into the ultimate crystal particles. Furthermore, the particles are weak in physical strength and break down mechanically to form dusty products. Since the alpha-chloroacetamide herbicides of the type disclosed are often skin irritants, in this respect the dusty montmorillonites do more harm than good.

It has been found that non-expanding lattice clays, for example, the illitic clays, such as bravosite, are useful carriers. These clays have structure similar to montmorillonites in being plate-like in structure but are not expanding lattice clays, being "fixed" by the presence of certain extraneous minerals, primarily potassium compounds in their crystal structure, which destroy the usual and objectionable properties of the expanding lattice bentonites. These illitic clays are capable of being formed into hard particles of relatively uniform size which retain to a limited extent their ability to adsorb organic compounds and particularly the alpha-chloroacetamides described above.

The illitic clay particles which are used in the practice of this invention are from 10–100 mesh, but preferably such that a large majority of the particles have from 14–60 mesh with optimum size being from 20–40 mesh. Illitic clay having substantially all particles between 14 and 80 mesh and at least about 80 percent between 20 and 40 mesh is particularly preferred for use in the present invention.

The preformed particles are sprayed with the alpha-chloroacetamide or a solution thereof while being rotated in a horizontal cylinder sloped so as to provide a continuous procedure in advancing the particles through the cylinder and withdrawing them after sufficient of the phytotoxic compound has been incorporated.

The particulate phytotoxic compositions of this invention generally contain from about 5 parts to about 30 parts by weight of the alpha-chloroacetamides described above per 100 parts by weight of illitic clay. The preferred phytotoxic compositions of this invention contain from about 10 parts to about 25 parts by weight of the above described alpha-chloroacetamides per 100 parts by weight of illitic clay.

Although the clay particles containing only the phytotoxic component are complete and capable of immediate usage, it is often found desirable to use adjuvants for the modification of the properties. If desired, solvents may be added, for example, kerosene, naphtha and fuel oil, each being immiscible in water, render the particles more stable to the presence of moisture and capable of longer life in the presence of high soil water concentrations. On other occasions it may be desirable to incorporate compounds with surface-active properties so as to increase their affinity for water or to provide for more uniform distribution of the particles. Other adjuvants for the purpose of providing special properties, for example, compounds having phytotoxic activity with respect to plants species resistant to the said alpha-chloroacetamides or active against objectionable soil organisms, such as nematodes, insect larvae, fungi, soil bacteria and viruses, may be included.

It has been found that the phytotoxicity of the alpha-chloroacetamides can be enhanced by the addition of other compounds. If trichlorobenzyl chloride is added to the alpha-chloroacetamides a much broader spectrum of activity is attained. Weeds of many different additional genera will be successfully destroyed by the phytotoxic compositions containing both the alpha-chloroacetamide and trichlorobenzyl chloride. This mixture will also have a more complete effect than either component alone and in this respect a synergistic activity will be observed, the mixture having a greater effect than the same amount of either compound will attain.

When a synergistic mixture of an alpha-chloroacetamide and another compound is employed in the practice of this invention each component can be present in an amount from about 5 parts to about 30 parts per 100 parts by weight of illitic clay. The preferred synergistic composition contains from about 10 parts to about 25 parts by weight of each component per 100 parts by weight of illitic clay.

The following examples set forth specific formulations which may be used in the practice of this invention.

*Example 1*

In field tests a formulation of 4 pounds per acre of N,N-diallyl alpha-chloroacetamide (CDAA) applied as particulate attapulgus clay containing 20% by weight of the said CDAA was used for comparison. A farm soil containing weed seeds predominately of crabgrass and foxtail was treated in replicated plots with 20% CDAA on illite and 10% CDAA on illite at varying rates to enable the determination of the level of application which would provide the same pre-emergent weed control as the 4 pounds per acre of CDAA on particulate attapulgus clay. It was found that 2.1 pounds per acre of 20% CDAA on particulate illite provided the same control as 4.0 pounds per acre of 20% CDAA on particulate attapulgus clay.

It was also found that 1.2 pounds of CDAA in a formulation consisting of 10% CDAA on particulate illite provided the same weed control as 4 pounds per acre of CDAA in a formulation of 20% CDAA on attapulgus clay. This means that the 10% formulation provides a more uniform soil coverage by the active component CDAA, shows high degree of adsorption, and gives a better weed control.

*Example 2*

The procedure of Example 1 was repeated at a later date under different soil conditions (temperature, humidity and soil moisture content). A 20% CDAA on particulate illite in the amount of 2.35 pounds per acre of CDAA was required to produce the same weed control as 4 pounds of CDAA, formulated as a 20% CDAA on attapulgus clay.

*Example 3*

The experimental plots of Example 1 were examined again one week later and at this time 2.8 pounds per acre of CDAA as 20% on illite was equivalent to 4 pounds of CDAA as 20% on attapulgus clay. The 10% CDAA on illite applied at the rate of about 0.9 pound CDAA per acre was equivalent to 4 pounds CDAA on attapulgus clay.

The compositions described herein are used to control growth of grasses and other weeds pre-emergently in soils. The phytotoxic composition may be used before seeds are planted or after the soil is seeded. The composition may be deposited uniformly on the surface of the soil, and, if desired, a light cultivation to a shallow depth may be done so as not to disturb the planted seeds. If the soil is treated before the seeding, the seed bed should be prepared and the planting operation should not involve extensive mixing of the phytotoxic composition with the soil.

The compositions should be applied in a phytotoxic amount which is usually one-tenth to 10 pounds per acre based on the alpha-chloroacetamide component.

The invention is set forth above with respect to specific examples. It is not intended that the details thereof shall be limitations on the scope of the invention except as set forth in the following claims.

The embodiments of the invention in which an exclusive property or privilege is claimed are defined as follows:

1. Composition comprising particulate illite clay and a herbicidal effective amount of an α-chloroacetamide of the formula

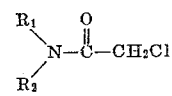

wherein $R_1$ and $R_2$ are selected from the group consisting of hydrogen and straight chain linear hydrocarbon of not more than six carbon atoms, provided that not more than one of $R_1$ and $R_2$ is hydrogen, said α-chloroacetamide being present in an amount from about 5 to about 30 parts by weight per 100 parts by weight of said clay, substantially all of the clay particles being between about 10 and 100 mesh.

2. Composition of claim 1 wherein $R_1$ and $R_2$ are alkyl.
3. Composition of claim 1 wherein $R_1$ and $R_2$ are alkenyl.
4. Composition of claim 1 wherein the alpha-chloroacetamide is present in an amount from about 10 to about 25 parts by weight per 100 parts by weight of clay.
5. Composition of claim 4 wherein substantially all the illite particles are between 14 and 80 mesh, and at least about 80 percent of the illite particles are between 20 and 40 mesh.

6. Composition of claim 4 wherein the acetamide is N,N-diallyl alpha-chloroacetamide.

7. Composition of claim 4 wherein the acetamide is N,N-diethyl alpha-chloroacetamide.

8. Composition of claim 4 wherein the acetamide is N,N-di-n-propyl alpha-chloroacetamide.

9. Composition of claim 4 wherein the acetamide is N,N-dipropargyl alpha-chloroacetamide.

10. Method of pre-emergently inhibiting the growth of plants in soil which comprises applying to the soil an effective amount of an alpha-chloroacetamide of the formula

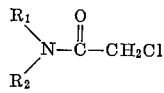

wherein $R_1$ and $R_2$ are selected from the group consisting of hydrogen and straight chain linear hydrocarbon of not more than 6 carbon atoms, provided that not more than one of the $R_1$ and $R_2$ is hydrogen, said alpha-chloroacetamide being applied to the soil as a composition comprising particulate illite clay containing from about 5 to about 30 parts by weight of said alpha-chloroacetamide per 100 parts by weight of said illite, substantially all of the illite clay particles being between 10 and 100 mesh.

11. Method of claim 10 wherein the acetamide is present in an amount from about 10 to 25 parts by weight per 100 parts by weight of illite clay.

12. Method of claim 11 wherein substantially all the illite particles are between 14 and 18 mesh and at least 80 percent of the illite clay particles are between 20 and 40 mesh.

13. Method of claim 11 wherein the acetamide is N,N-diallyl alpha-chloroacetamide.

14. Method of claim 11 wherein the acetamide is N,N-diethyl alpha-chloroacetamide.

15. Method of claim 11 wherein the acetamide is N,N-dipropyl alpha-chloroacetamide.

References Cited

UNITED STATES PATENTS

| | | | |
|---|---|---|---|
| 2,864,683 | 12/1958 | Hamm et al. | 71—2.7 |
| 3,108,038 | 10/1963 | Fielding et al. | 71—2.3 |
| 3,235,368 | 2/1966 | Surgant | 71—2.7 |

OTHER REFERENCES

Frissel et al.: Soil Science, vol. 94, #5, pages 284 to 291, 11–1962, 71/A.D.

Szepesi et al.: Chemical Abstracts, vol. 53, col. 20664(a), 1959, 71/A.D.

JAMES O. THOMAS, Jr., *Primary Examiner.*